(12) United States Patent
Okada

(10) Patent No.: US 6,215,392 B1
(45) Date of Patent: Apr. 10, 2001

(54) SENSING DEVICE FOR DETECTING MOVEMENT OF VEHICLE BY LANE-MARKER

(75) Inventor: Tsuyoshi Okada, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/552,457

(22) Filed: Apr. 18, 2000

(30) Foreign Application Priority Data

Apr. 22, 1999 (JP) .................................................. 11-115238

(51) Int. Cl.⁷ ....................................................... B60Q 1/00
(52) U.S. Cl. .......................... 340/436; 340/903; 701/301
(58) Field of Search .................................... 340/436, 901, 340/903, 905, 937, 435; 701/301

(56) References Cited

U.S. PATENT DOCUMENTS

| | | |
|---|---|---|
| 4,970,653 * | 11/1990 | Kenue .................................. 701/301 |
| 5,165,497 | 11/1992 | Chi . |
| 5,245,422 | 9/1993 | Borcherts et al. . |
| 5,686,925 | 11/1997 | Maeda et al. . |
| 5,835,028 | 11/1998 | Bender et al. . |
| 5,940,010 * | 8/1999 | Sasaki et al. ......................... 340/436 |
| 6,114,951 * | 9/2000 | Kinoshita et al. .................... 340/436 |
| 6,122,597 * | 9/2000 | Saneyoshi et al. ................... 701/301 |

* cited by examiner

*Primary Examiner*—Daniel J. Wu
(74) *Attorney, Agent, or Firm*—Ratner & Prestia

(57) ABSTRACT

A sensing device for detecting a vehicle's skid, an attitude and a speed with lane markers. This sensing device allows sensors mounted on the vehicle to detect lane markers arranged on the lane center along a road. The lane markers are detected in a magnetic, electric, or optical manner. Based on outputs of the sensors, a movement of the vehicle is measured. Two sensors each are provided on front and rear of the vehicle. Four outputs from the respective sensors are calculated based on given equations (additions and subtractions) so that a skid amount of the vehicle from the lane center, the attitude and the speed of the vehicle can be found. This simple construction formed by the sensors detecting the lane markers and the circuits performing addition and subtraction can measure the skid, attitude and speed of the vehicle.

15 Claims, 8 Drawing Sheets

SENSING DEVICE FOR DETECTING MOVEMENT OF VEHICLE BY LANE-MARKER

FIELD OF THE INVENTION

The present invention relates to a sensing device detecting a movement of a vehicle by lane markers. More particularly, it relates to a sensing device detecting the vehicle's movement based on information from the lane markers, which are embedded in roads as main indicators of the Intelligent Transport Systems (ITS) including an automatic steering device, a veer-off-the-lane alarming device and the like.

BACKGROUND OF THE INVENTION

In the automatic steering device and veer-off-the-lane alarming device of the ITS, a deviated amount from the lane is frequently required for detecting a vehicle running on the lane because the deviated amount tells the driver whether the vehicle keeps running on the lane or drifts outside the lane. The lane markers are embedded in respective lanes of roads with given intervals as indicators from which veer-off from the lane and a skid amount from the lane can be found. The relative relation between the lane marker and vehicle is detected, thereby telling the movement of the vehicle.

FIG. 1 illustrates a conventional sensing device for detecting an attitude of a vehicle utilizing lane markers. Lane markers 52 are set on each lane in a road with given intervals. Vehicle 51 has two lane-marker detectors 53 and 54 on its front for detecting lane markers 52, i.e. detector 53 on the front left of the vehicle for detecting lane markers on the left-hand side, and detector 54 on the front right of the vehicle for detecting lane markers on the right-hand side. When detecting lane marker 52, detector 53 outputs FL, and when detecting lane marker 52, detector 54 outputs FR. If vehicle 51 deviates to the right with regard to the lane, FL becomes greater than FR. If vehicle 51 deviates to the left with regard to the lane FR becomes greater than FL.

Skid-detector 55 finds skid amount TE from the following equation.

$$TE = K1 \times (FL - FR)$$

where K1 is a proportionality constant.

When TE takes a positive value, the vehicle shifts to the right, and when TE takes a negative value, the vehicle shifts to the left. An absolute value of TE is proportional to the skid amount.

The construction discussed above allows the conventional sensing device to detect lane markers 52 set on the road by lane-marker detectors 53, 54 disposed on both sides on the front of the vehicle, thereby finding the skid amount including a skid-direction of right or left.

This construction of the conventional sensing device; however, only measures a skid amount, and other apparatus including cameras and speed sensors are essentially required for monitoring the movement including an attitude and speed of the vehicle.

In addition to this problem, detectors 53, 54 disposed only on the front of the vehicle results in detecting a different amount from an actual skid amount when the vehicle takes an attitude different from the road travelling direction.

SUMMARY OF THE INVENTION

The present invention addresses the problems discussed above and aims to provide a sensing device for detecting a vehicle's movement including skid, an attitude, a running speed and the like. This sensing device can find skid, an attitude and a running speed of the vehicle with a simple construction—no camera or a speed sensor is required—by using the lane markers.

DETAILED DESCRIPTION OF THE PREFERRED EMBODIMENT

An exemplary embodiment of the present invention is demonstrated hereinafter with reference to the accompanying drawings.

Figure 2:
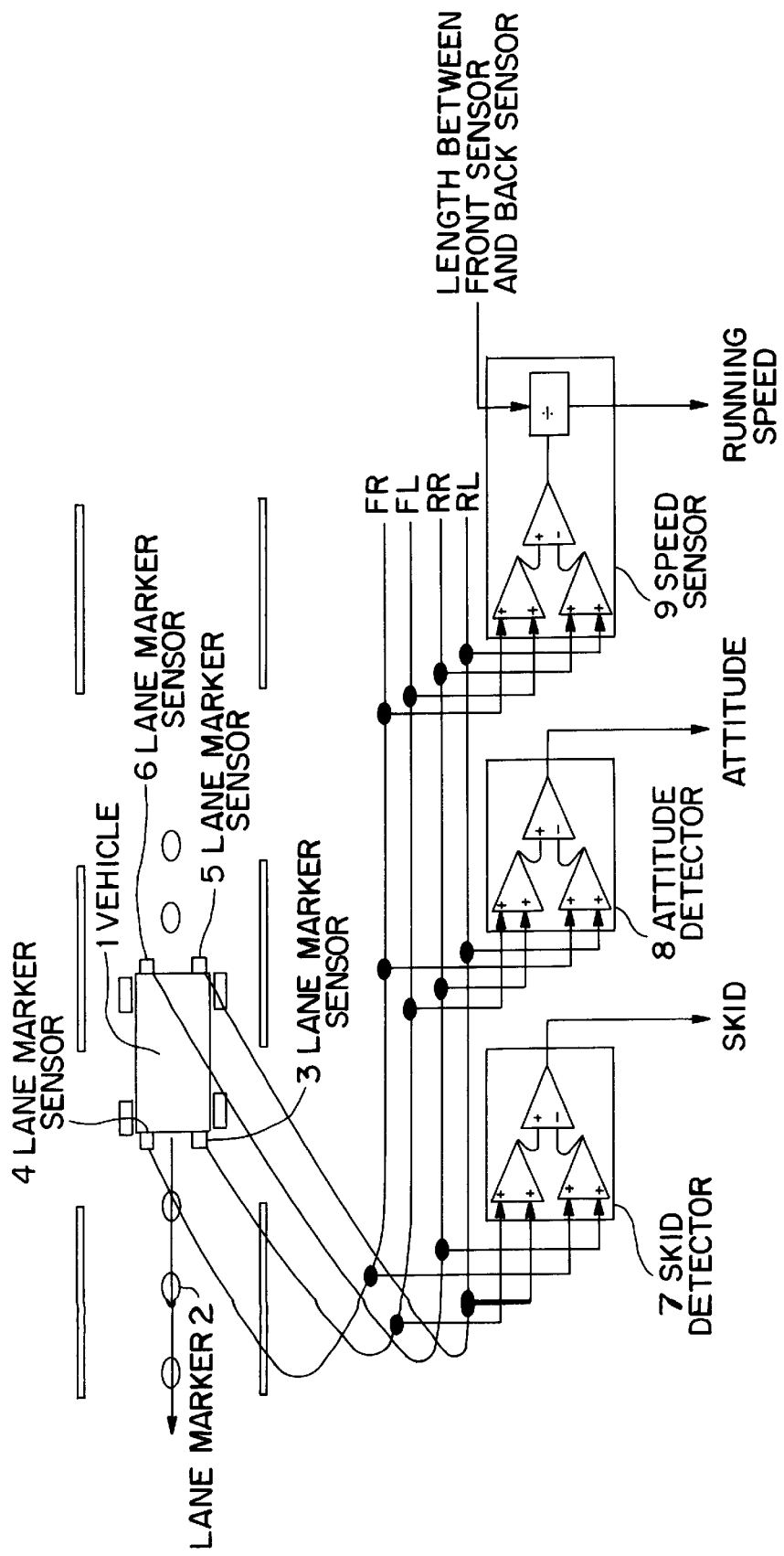
FIG. 2 illustrates a concept of a sensing device of the present invention by using the lane markers.

In FIG. 2, lane markers 2 are set or embedded on each lane in the road with given intervals. Lane-marker-sensors 3, 4, 5 and 6 (hereinafter referred to as sensors 3, 4, 5 and 6) are provided to vehicle 1 on its left and right side on front part as well as on its left and right side on rear part of vehicle 1 respectively in this order. These sensors 3, 4, 5 and 6 detect an intensity of some physical amount imparted from lane markers 2 by a certain method. For instance, when lane markers 2 are formed by light reflective panels, sensors 3, 4, 5 and 6 transmit light from vehicle 1 and detect intensities of reflected lights. Another instance is this: when lane markers 2 comprise a resonant circuit or a magnetostrictive element which resonates a frequency of a radio wave, the radio wave carrying the frequency is transmitted to the lane markers 2, and detect an intensity of the echo from lane markers 2. When lane markers 2 comprise permanent magnets, vehicle 1 employs a magnetic detecting device such as an MR element thereby detecting changes in the magnetic field.

Respective outputs from sensors 3, 4, 5 and 6 are supplied to skid detector 7, attitude detector 8, speed sensor 9. These outputs undergo given addition and subtraction so that a skid amount, attitude and running speed can be detected.

Figure 3A:
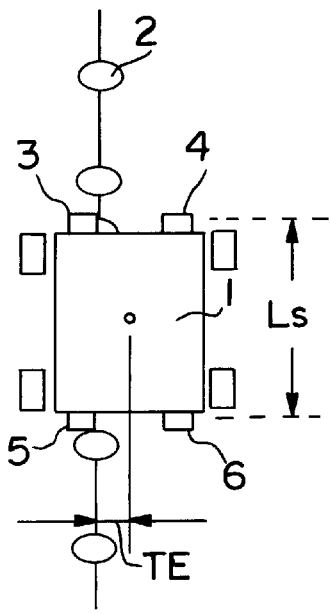
FIGS. 3(A)–3(D) illustrate an operating theory of the sensing devices and changes of outputs of lane-marker detectors.
Figure 3B:
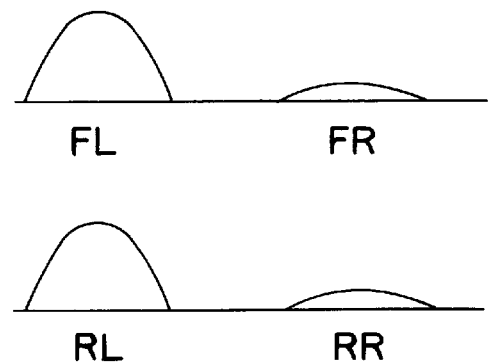
Figure 3C:
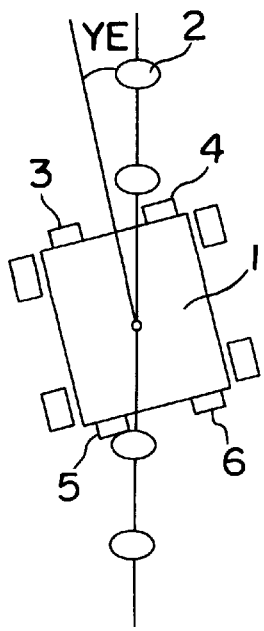
Figure 3D:
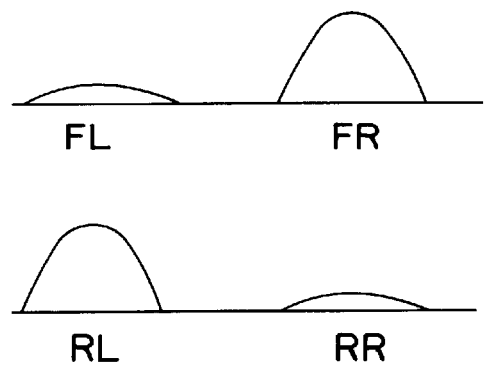

Next, an operation of the sensing device is demonstrated. FIG. 3(A) and FIG. 3(C) show relations between vehicle 1 and lane markers 2 when vehicle 2 detects skid and an attitude drift (a yawing angle with respect to traveling direction) from lane markers 2. FIG. 3(B) and FIG. 3(D) show changes of outputs from sensors 3, 4, 5 and 6.

Respective sensors' outputs are named FL for sensor 3 on front left, FR for sensor 4 on front right, RL for sensor 5 on rear left and RR for sensor 6 on rear right of the vehicle.

FIG. 3(A) shows a case when vehicle 1 goes into a skid in the lane. When vehicle 1 runs upward in the drawing, vehicle 1 goes into a skid to the right by a skid amount TE from the center of the lane, i.e. from a row of lane markers 2. At this time, sensors 3 and 5 nearer to lane markers 2 output greater values than the others. In other words, FL and RL are greater than FR and RR as shown in FIG. 3(B).

Meanwhile, space "Ls" spans the distance between sensors 3 and 5 as well as sensors 4 and 6, because of the difference between the mounting positions of front sensors and rear sensors. Due to this space "Ls", a time difference corresponding to the time for travelling space "Ls" exists between FL and FR, or RL and RR, although FL and FR, or RL and RR output the intensity change from the identical lane marker 2.

To the contrary, when vehicle 1 goes into a skid to the left from the lane center, FL and RL become smaller than FR and RR.

Figure 1:
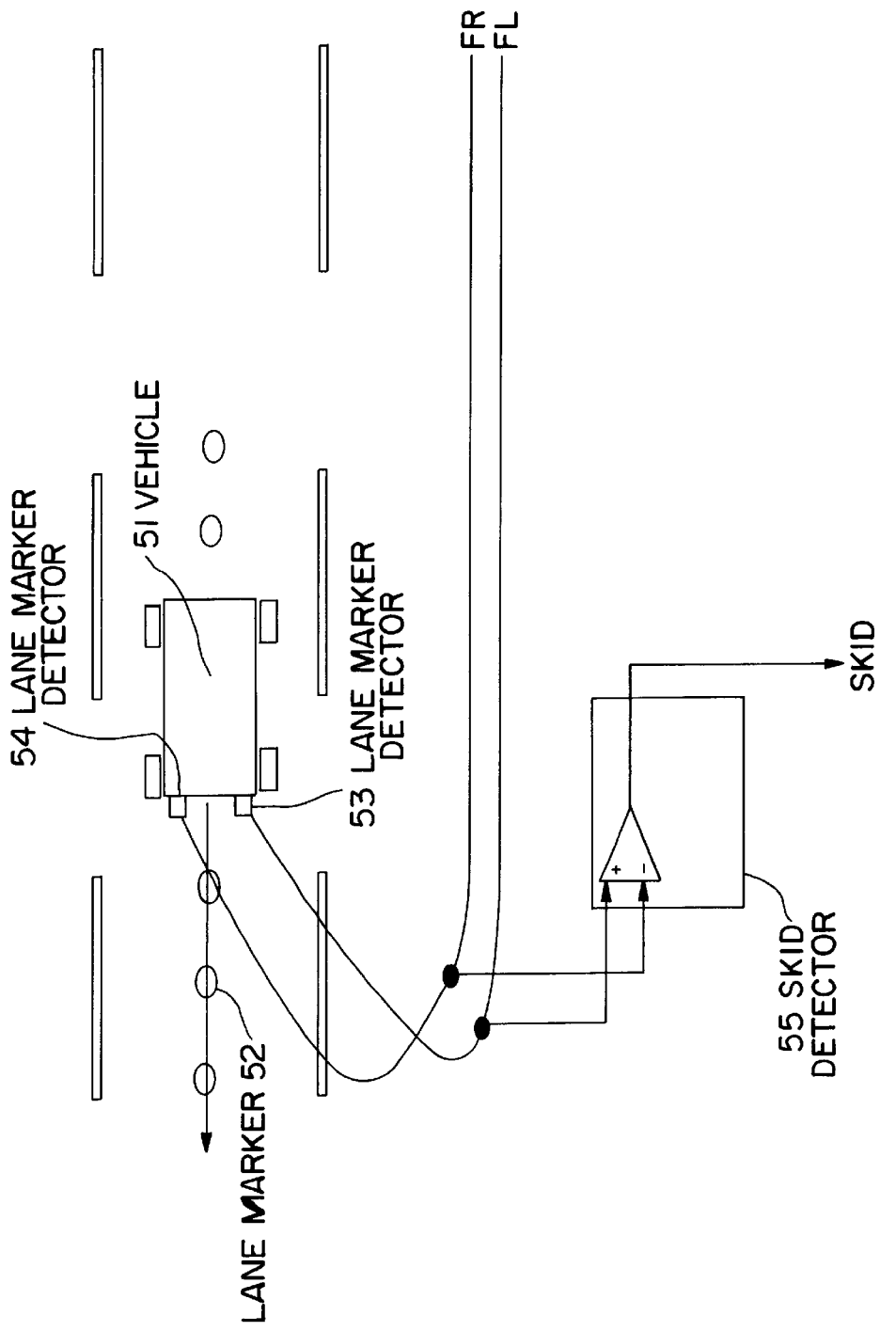
FIG. 1 illustrates a concept of a conventional sensing device of vehicle's movement by using the lane markers.

In FIG. 1, skid detector 7 performs addition and subtraction of respective outputs FL, FR, RL and RR when the four sensors detect the same lane marker 2, thereby calculating skid amount TE with regard to the center of the lane by the following equation.

$$TE=K1\times\{(FL+RL)-(FR+RR)\}$$

where K1 is a proportionality constant.

FIG. 3(C) shows a case when vehicle 1 drifts from the lane markers 2, so that the attitude of vehicle 1 changes. When the attitude drifts by yawing angle YE to the left from a row of lane markers 2, FR and RL become greater than FL and RR as shown in FIG. 2(D). In the case of drifting to the right, FR and RL become smaller than FL and RR.

Attitude detector 8 shown in FIG. 1 performs addition and subtraction of respective outputs FL, FR, RL and RR when the four sensors detect the same lane marker 2, thereby calculating the attitude of vehicle 1 with regard to lane markers 2, i.e. yawing-angle YE by the following equation.

$$YE=K2\times\{(FL+RR)-(FR+RL)\}$$

where K2 is a proportionality constant.

Space Ls between sensors 3, 4 and sensors 5, 6 produce a time difference between FL, FR (outputs from sensors 3, 4) and RL, RR (outputs from sensors 5, 6) although the lane marker 2 imparts a single intensity change. This time-difference "dt" is expressed in the following equation.

$$dt=Ls/V$$

Therefore, a predetermined space Ls can find speed V by measuring "dt".

Figure 4C:
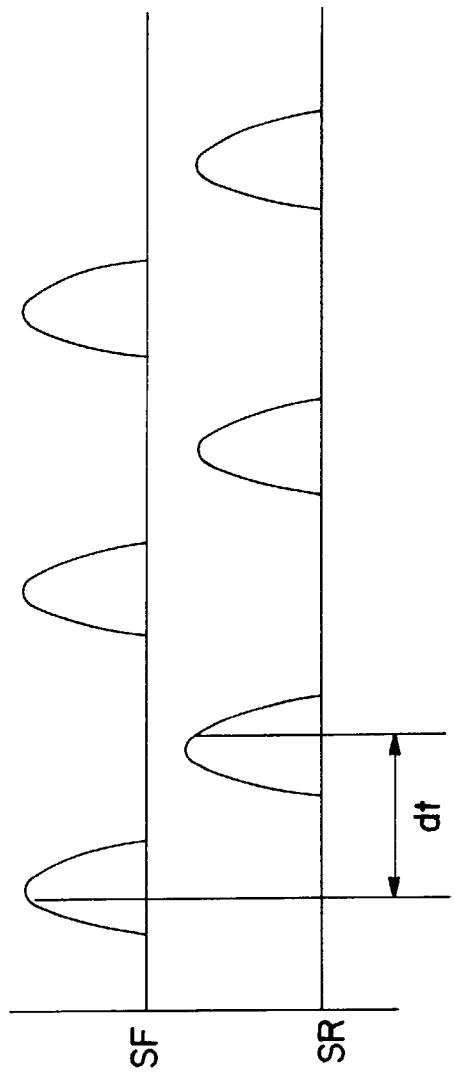
FIGS. 4(A)–4(D) illustrate how the sensing device of the present invention detects a running speed of the vehicle.
Figure 4D:
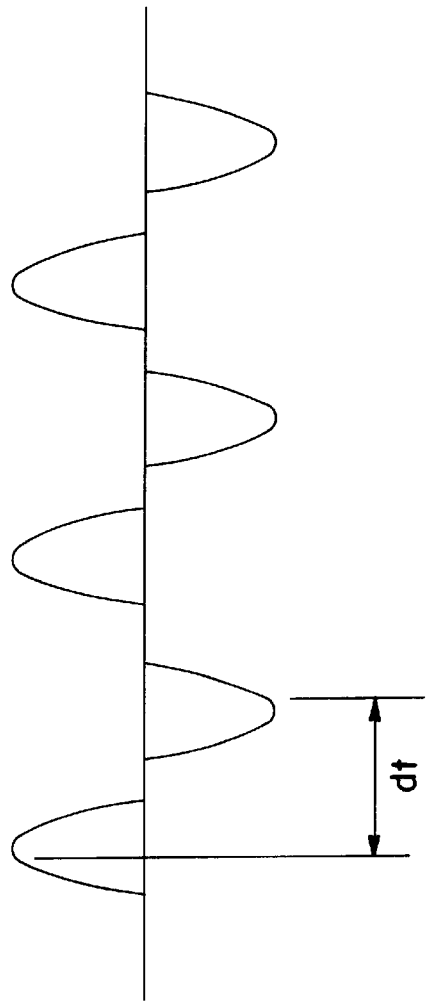
Figure 4A:
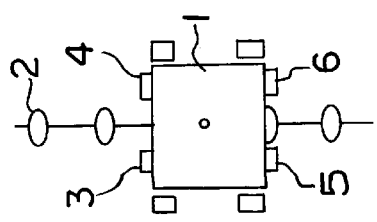
Figure 4B:
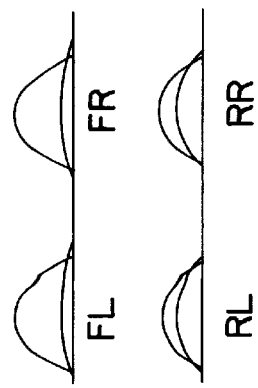

FIGS. 4(A) through 4(D) illustrate the theory of measuring time-difference "dt". FIG. 4(A) illustrates a status where vehicle 1 runs just above lane markers 2. FIG. 4(B) shows the four outputs of sensors 3, 4, 5 and 6. As shown in FIG. 4(B), when the sensors are compared at the same timing, the front sensors have different outputs from the rear sensors due to space Ls, i.e. difference of the mounting positions.

The outputs sum SF of sensors 3, 4 and the outputs sum SR of sensors 5, 6 are calculated by the following equations:

$$SF=FL+FR$$

$$SR=RL+RR$$

FIG. 4(C) shows SF and SR thus calculated on a time axis. The same output change observed in SF can be seen in SR after time difference "dt" from SF. This time difference "dt" equals to the time difference between the peaks of output signals of SF and SR, and the output peaks are measured when the front sensors and the rear sensors pass the same lane marker 2. This relation is expressed in the following equation.

$$dt=SF-SR=(FL+FR)-(RL+RR)$$

Therefore, speed sensor 9 shown in FIG. 1 can find speed V by the following equation.

$$V=\{(FL+FR)-(RL+RR)\}/Ls$$

The detected outputs from sensors 3, 4, 5 and 6 sometimes include disturbances—which change in rather greater cycles—such as changes of road-reflection-factor, clatter noises proper to the road. These disturbances cause an error in measuring time difference "dt". This error can be corrected by the following method: Find an output difference DFR between the front sensors and rear sensors by the equation as follows:

$$DFR=K3\times\{(FL+FR)-(RL+RR)\}$$

where K3 is a proportionality constant.

As such, the disturbances changing in rather greater cycles can be thus eliminated.

FIG. 4(D) shows the changes of DFR on the time axis. Time difference "dt" between a positive peak and negative peak gained from the same lane marker 2 is found from difference DFR. Speed V can be found by calculating Ls/dt, where Ls has been measured and is handled as a known quantity.

Figure 5:
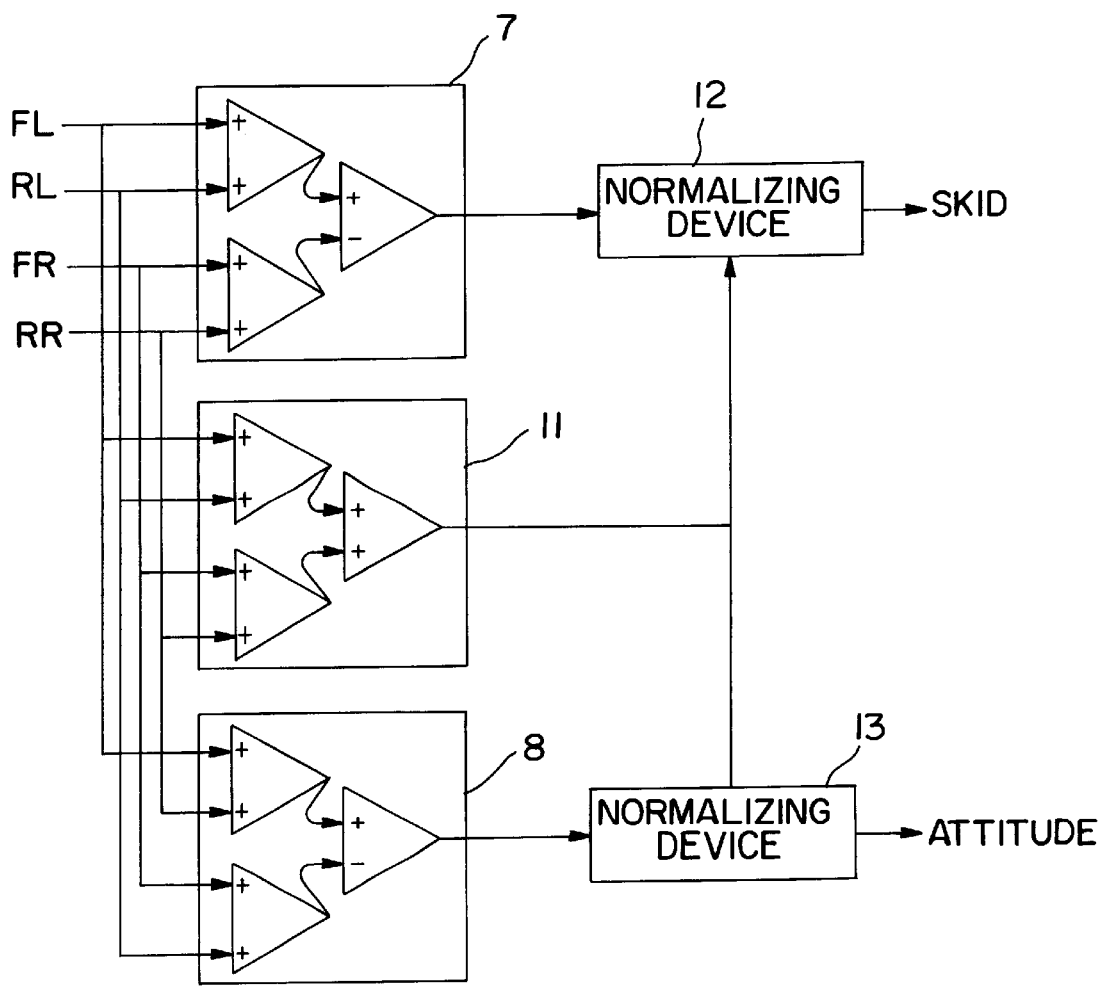
FIG. 5 is a circuit diagram illustrating a construction of a skid detector of the sensing device of the present invention.

FIG. 5 shows how the skid detector of the sensing device of the present invention is normalized. In FIG. 5, the outputs FL, FR, RL and RR of sensors 3, 4, 5 and 6 have some dispersions due to the road condition and mounting dispersions of the sensors in height and the like. These dispersions also produce dispersion in a relation between inputs to skid detector 7 and outputs from detector 7, where the inputs are referred to as the output changes of sensors 3, 4, 5 and 6, and the outputs are referred to as the skid amount. In other words, the dispersions of FL, FR, RL and RR affect the sensitivity of skid detector 7. In order to suppress this sensitivity dispersion of the skid-detector, the total output of sensors 3, 4, 5 and 6 is calculated by total-sum-calculator 11.

$$Sum=FL+FR+RL+RR$$

Then the output from skid detector 7 is divided by this "Sum". This division is performed in normalizing device 12. As a result, the sensitivity dispersion of the skid detector can be suppressed.

In the same way, the output from attitude detector 8 is divided by the "Sum". This division is performed in normalizing device 13. As a result, the sensitivity dispersion of attitude detector 8 is suppressed.

Figure 6:
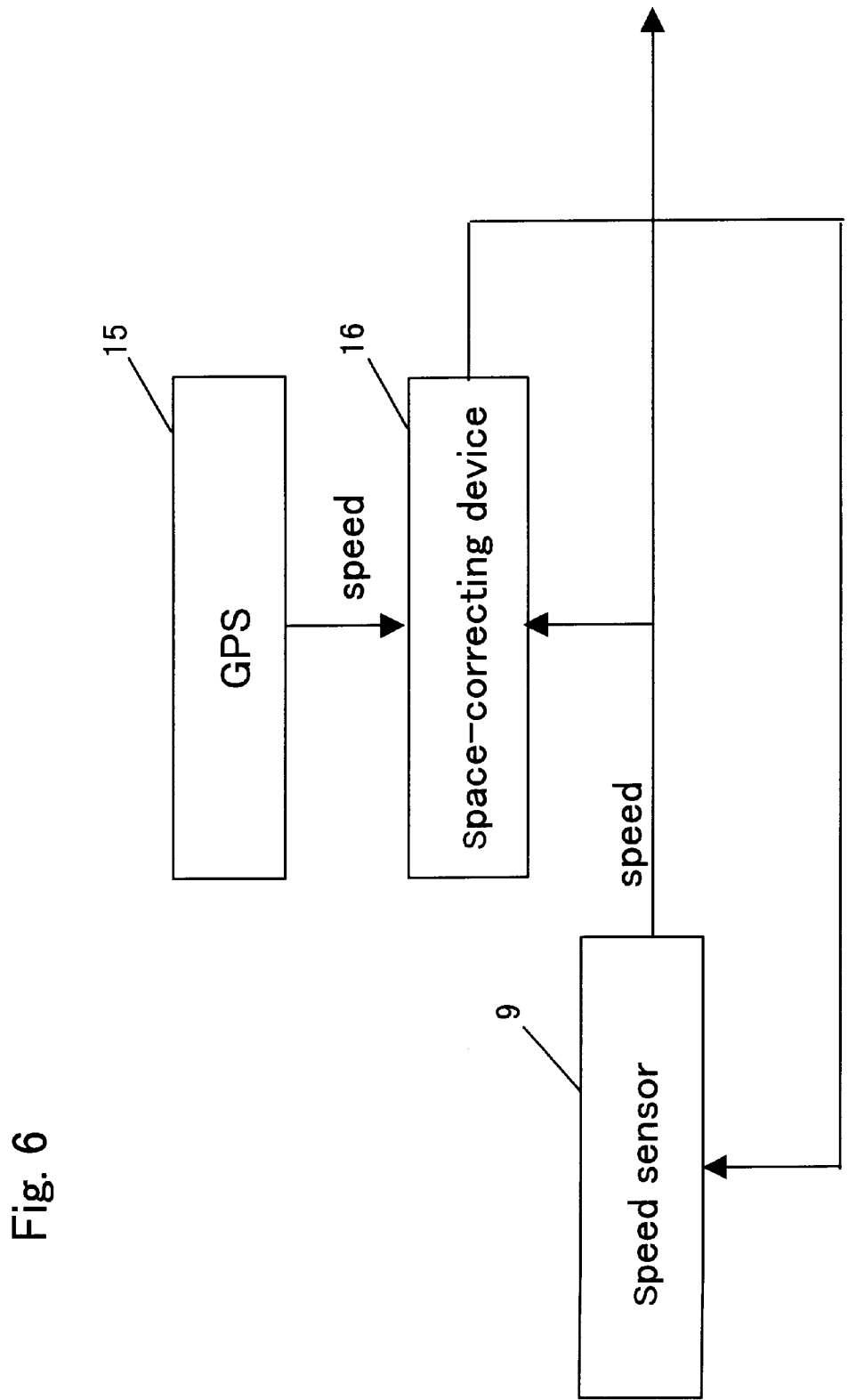
FIG. 6 is a block diagram illustrating how a predetermined length of the vehicle is corrected.

FIG. 6 illustrates how a space-correcting device corrects space Ls between front sensors 3, 4 and rear sensors 5, 6 of the sensing device of the present invention.

When speed sensor 9 measures a speed of the vehicle, the measured speed has some error if the known quantity Ls has included an error. In this embodiment, global positioning system (GPS) 15 can correct this speed error.

GPS 15 can find an absolute position and absolute speed of a receiver based on information from GPS satellite in the sky. However, the receiver is not always able to receive the information from the satellite and the satellite is available only when the sky is open. Therefore, when GPS 15 can receive the information from the GPS satellite and calculate a speed, space-correcting device 16 can correct an error of space Ls by comparing the speed obtained by GPS 15 with the speed obtained by speed sensor 9. This results in finding a correct speed of the vehicle even if the known quantity Ls includes some error. GPS 15, as a speed measuring device, is disclosed in U.S. Pat. No. 5,686,925, the description thereof is thus omitted here.

Figure 7:
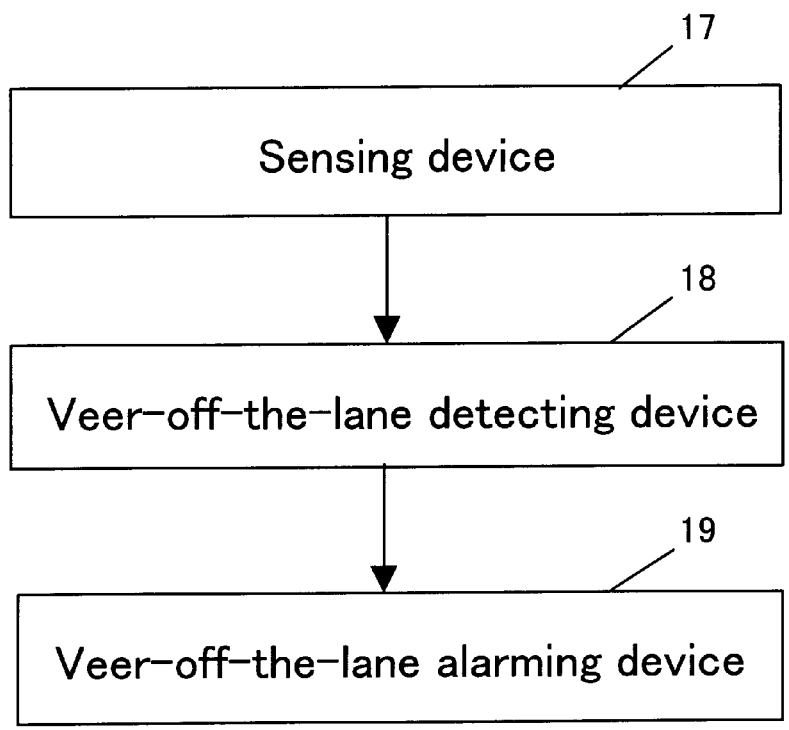
FIG. 7 is a block diagram illustrating a veer-off-the-lane alarming device of the sensing device of the present invention.

FIG. 7 illustrates a working mechanism of a veer-off-the-lane alarming device employing the sensing device of the present invention. Sensing device 17 shown in FIG. 1 of the present invention provides the information of skid, an attitude and speed of the vehicle. Based on this information, veer-off-the-lane detecting device 18 determines whether or not the present skid amount is over a given amount, or guesses danger that the present skid amount will exceed the given value before long considering the attitude and speed. This judge can be established by calculations in a microcomputer. Veer-off-the-lane alarming device 19 gives an alarm with a sound or a display when detecting device 18 determines that vehicle 1 is out of the lane or guesses the danger of veering off the lane. A driver of vehicle 1 can correct the attitude of vehicle 1 by this alarm.

This alarming device not only informs whether or not the vehicle is out of the lane, but also guesses the danger of vehicle's veering off the lane considering the attitude and speed.

Figure 8:
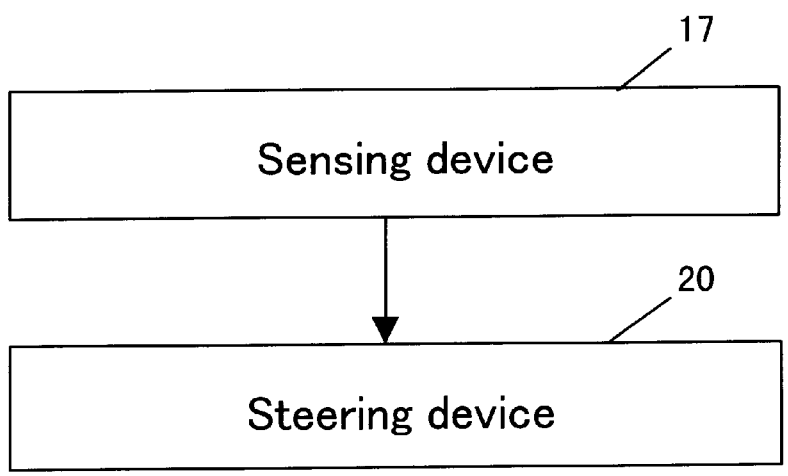
FIG. 8 is a block diagram illustrating an automatic steering device of the sensing device of the present invention.

FIG. 8 illustrates a working mechanism of an automatic steering device employing the sensing device of the present invention. Based on the data about skid-amount and attitude of vehicle 1 by sensing device 17, steering device 20 controls the yawing angle of vehicle 1 so that vehicle 1 can keep the lane not requiring the driver's manipulation. Steering device 20 is a known element because U.S. Pat. No. 5,245,422 discloses the similar thing. The description of device 20 is thus omitted here.

Figure 9:
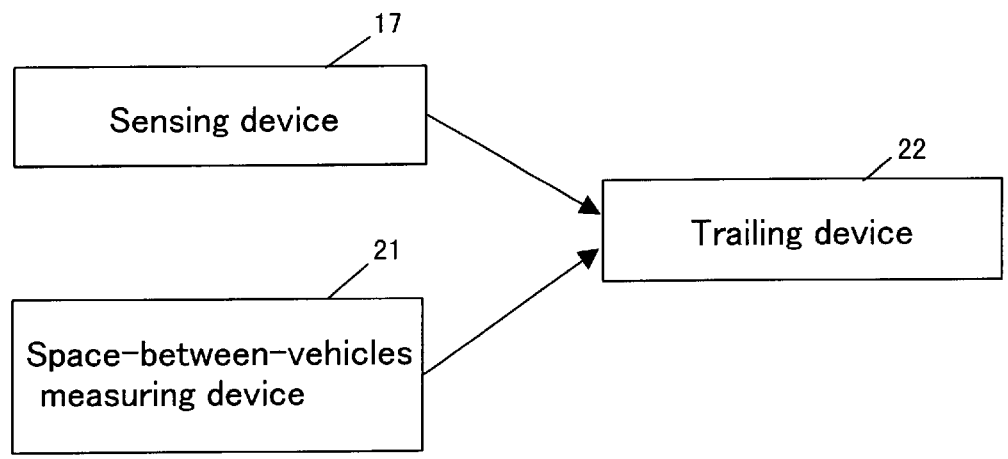
FIG. 9 is a block diagram illustrating a space-between-vehicles controller.

FIG. 9 illustrates a working mechanism of a space-between-vehicles controller employing the sensing device of the present invention. Based on the data of skid-amount and attitude of vehicle 1 by sensing device 17, another vehicle ahead of vehicle 1 on the same lane can be guessed its existing direction by monitoring the positional relation between vehicle 1 and the lane. Space-between-vehicles measuring device 21, such as an extremely-high-frequency (EHF) radar, searches whether or not a vehicle ahead exists in a direction guessed. When it exists, the distance between vehicle 1 and the vehicle ahead is found. Trailing device 22 determines the amount of speed to be increased or decreased of vehicle 1 based on the distance and the speed obtained by sensing device 17, thereby trailing the vehicle ahead on the same lane in a steady manner. Space-between-vehicles measuring device 21 is disclosed e.g. by U.S. Pat. No. 5,165,497. The description of device 21 is thus omitted here.

Figure 10:
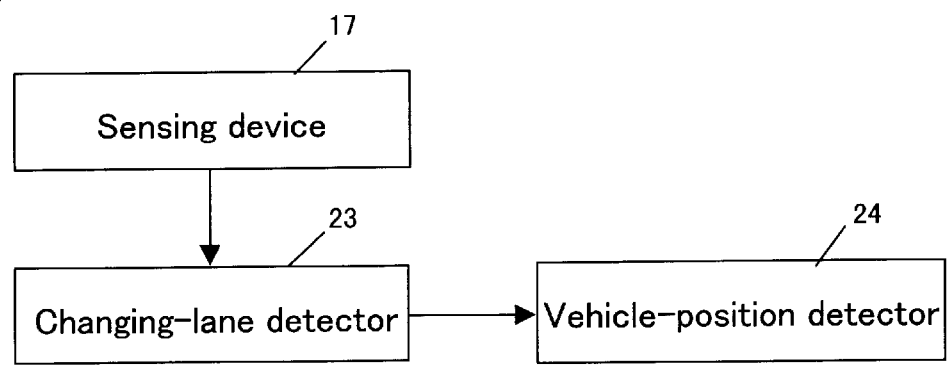
FIG. 10 is a block diagram illustrating a car-navigation system of the sensing device of the present invention.

FIG. 10 illustrates a working mechanism of a car-navigation-system employing the sensing device of the present invention. Based on the skid and attitude measured by sensing device 17, changing-lane detector 23 recognizes the vehicle has changed the lane when the measured values exceed given values, then informs vehicle-position detector 24 of this lane change. Detector 24 recognizes that vehicle 1 has changed the lane from the inside lane to a fast lane, or vehicle 1 has entered an exit lane from a free way and then gets off an interchange via an exit ramp, thereby identifying the present position of vehicle 1. This information is displayed on the car-navigation system so that the driver can identify correctly the present location.

As such, this construction allows the car-navigation system to recognize vehicle 1 changing the lane or veering off the road when the measured values of skid and attitude exceed the given values. Thus this car-navigation system can guide the driver to a lane in the more delicate manner by recognizing a lane change.

What is claimed is:

1. A sensing device for detecting a movement of a vehicle comprising:
    a lane marker arranged along a lane center of a road;
    a first lane-marker-detector and a second lane-marker-detector disposed left and right sides respectively on front of a vehicle;
    a third lane-marker-detector and a fourth lane-marker-detector disposed left and right sides respectively on rear of the vehicle; and
    a skid detector for calculating a skid amount of the vehicle from the lane center by performing addition and subtraction of respective outputs from said first, second, third and fourth lane-marker-detectors.

2. The sensing device as defined in claim 1, wherein said skid detector calculates the skid amount by finding a difference between an output sum of the first and third lane-marker-detectors and an output sum of the second and fourth lane-marker-detectors.

3. A sensing device for detecting a movement of a vehicle comprising:
    a lane marker arranged along a lane center of a road;
    a first lane-marker-detector and a second lane-marker-detector disposed left and right sides respectively on front of a vehicle;
    a third lane-marker-detector and a fourth lane-marker-detector disposed left and right sides respectively on rear of the vehicle; and
    an attitude detector for calculating an attitude with regard to the road direction by performing addition and subtraction of respective outputs from said first, second, third and fourth lane-marker-detectors.

4. The sensing device as defined in claim 3, wherein said attitude detector calculates a yawing angle YE, which represents a deviated angle from the road direction and indicates an attitude of the vehicle, by finding a difference between an output sum of the first and fourth lane-marker-detectors and an output sum of the second and third lane-marker-detectors.

5. A sensing device for detecting a movement of a vehicle comprising:
    a lane marker arranged along a lane center of a road;
    a first lane-marker-detector and a second lane-marker-detector disposed left and right sides respectively on front of a vehicle;
    a third lane-marker-detector and a fourth lane-marker-detector disposed left and right sides respectively on rear of the vehicle; and
    a speed sensor of the vehicle for calculating a speed of the vehicle performing addition and subtraction of respective outputs from said first, second, third and fourth lane-marker-detectors and by using one of a space "Ls" between said first and third lane-marker-detectors, and said second and fourth lane-marker-detectors.

6. The sensing device as defined in claim 5, wherein said speed sensor calculates the speed of the vehicle by finding an output sum SF of said first and second lane-marker-detectors and an output sum SR of said third and fourth lane-marker-detectors, then finding a time difference "dt"

between peaks of output signals from the SF and the SR—both appearing when said detectors pass the same lane marker—and finding "Ls"/"dt".

7. The sensing device as defined in claim 5, wherein said speed sensor calculates the speed of the vehicle by finding a difference DFR between an output sum of said first and second lane-marker-detectors and an output sum of said third and fourth lane-marker-detectors, then finding a time difference "dt" between a positive peak and a negative peak—both being obtained from the same lane marker in the DFR—and finding "Ls"/"dt".

8. The sensing device as defined in claim 2 further comprising:
   a total sum calculator for calculating a sum of respective outputs of said first, second, third and fourth lane-marker-detectors; and
   a normalizing device for normalizing said skid detector by dividing an output from said skid detector by an output of said calculator.

9. The sensing device as defined in claim 4 further comprising:
   a total sum calculator for calculating a sum of respective outputs of said first, second, third and fourth lane-marker-detectors; and
   a normalizing device for normalizing said attitude detector by dividing an output from said attitude detector by an output of said calculator.

10. The sensing device as defined in claim 6 further comprising:
    a global positioning system (GPS); and
    a space correcting device for correcting an error of space "Ls" by comparing a speed measured by said GPS with a speed obtained by said speed sensor.

11. A sensing device for detecting a movement of a vehicle comprising:
    a lane marker arranged along a lane center of a road;
    a first lane-marker-detector and a second lane-marker-detector disposed left and right sides respectively on front of a vehicle;
    a third lane-marker-detector and a fourth lane-marker-detector disposed left and right sides respectively on rear of the vehicle;
    a skid detector for calculating a skid amount of the vehicle from the lane center by performing addition and subtraction of respective outputs from said first, second, third and fourth lane-marker-detectors;
    an attitude detector for calculating an attitude of the vehicle with regard to the road direction by performing addition and subtraction of respective outputs from said first, second, third and fourth lane-marker-detectors;
    a speed sensor of the vehicle for calculating a speed of the vehicle performing addition and subtraction of respective outputs from said first, second, third and fourth lane-marker-detectors and by using one of a space "iLs" between said first and third lane-marker-detectors, and said second and fourth lane-marker-detectors.

12. A veer-off-the-lane alarming device comprising:
    a sensing device for detecting a movement of a vehicle;
    a veer-off detector for recognizing one of statuses where a vehicle to be out of a lane and the vehicle is in a danger of veering off the lane based on data obtained from said sensing device about a skid amount, an attitude and a speed of the vehicle; and
    an alarming device for giving one of alarms of having veered off the lane and being in danger of veering off the lane to a driver of the vehicle,
    wherein said sensing device comprises:
        a lane marker arranged along a center of a lane;
        a first lane-marker-detector and a second lane-marker-detector disposed left and right sides respectively on front of a vehicle;
        a third lane-marker-detector and a fourth lane-marker-detector disposed left and right sides respectively on rear of the vehicle; and
        a skid detector for calculating a skid amount of the vehicle from the lane center by performing addition and subtraction of respective outputs from said first, second, third and fourth lane-marker-detectors;
        an attitude detector for calculating an attitude of the vehicle with regard to the road direction by performing addition and subtraction of respective outputs from said first, second, third and fourth lane-marker-detectors; and
        a speed sensor for calculating a speed of the vehicle by performing addition and subtraction of respective outputs from said first, second, third and fourth lane-marker-detectors and by using one of a space "Ls" between said first and third lane-marker-detectors, and said second and fourth lane-marker-detectors.

13. An automatic steering device comprising:
    a sensing device for detecting a movement of a vehicle; and
    a steering device for controlling a yawing angle based on a skid amount and an attitude obtained by said sensing device;
    wherein said sensing device comprises:
        a lane marker arranged along a center of a lane;
        a first lane-marker-detector and a second lane-marker-detector disposed left and right sides respectively on front of a vehicle;
        a third lane-marker-detector and a fourth lane-marker-detector disposed left and right sides respectively on rear of the vehicle; and
        a skid detector for calculating a skid amount of the vehicle from the lane center by performing additions and subtractions of respective outputs from said first, second, third and fourth lane-marker-detectors;
        an attitude detector for calculating an attitude of the vehicle with regard to the road direction by performing additions and subtractions of respective outputs from said first, second, third and fourth lane-marker-detectors; and
        a speed sensor for calculating a speed of the vehicle by performing additions and subtractions of respective outputs from said first, second, third and fourth lane-marker-detectors and by using one of a space "Ls" between said first and third lane-marker-detectors, and said second and fourth lane-marker-detectors.

14. A space-between-vehicles controller comprising:
    a sensing device for detecting a movement of a vehicle;
    a space-between-vehicles measuring device; and
    a trailing device for trailing another vehicle ahead of the vehicle on a same lane based on an attitude obtained by an attitude detector and a distance measured by said space-between-vehicles measuring device,
    wherein said sensing device comprises:
        a lane marker arranged along a center of a lane;
        a first lane-marker-detector and a second lane-marker-detector disposed left and right sides respectively on front of a vehicle;

a third lane-marker-detector and a fourth lane-marker-detector disposed left and right sides respectively on rear of the vehicle; and a skid detector for calculating a skid amount of the vehicle from the lane center by performing addition and subtraction of respective outputs from said first, second, third and fourth lane-marker-detectors;

an attitude detector for calculating an attitude of the vehicle with regard to the road direction by performing addition and subtraction of respective outputs from said first, second, third and fourth lane-marker-detectors; and a speed sensor for calculating a speed of the vehicle by performing addition and subtraction of respective outputs from said first, second, third and fourth lane-marker-detectors and by using one of a space "Ls" between said first and third lane-marker-detectors, and said second and fourth lane-marker-detectors.

15. A car navigation system comprising:

a sensing device for detecting a movement of a vehicle;

a changing-lane detector for detecting one of statuses of the vehicle of changing the lane and being out of a road when a skid amount obtained by a skid detector—an element of said sensing device—exceeds a given value;

wherein said sensing device comprises:

a lane marker arranged along a center of a lane;

a first lane-marker-detector and a second lane-marker-detector disposed left and right sides respectively on front of a vehicle;

a third lane-marker-detector and a fourth lane-marker-detector disposed left and right sides respectively on rear of the vehicle; and a skid detector for calculating a skid amount of the vehicle from the lane center by performing addition and subtraction of respective outputs from said first, second, third and fourth lane-marker-detectors;

an attitude detector for calculating an attitude of the vehicle with regard to the road direction by performing addition and subtraction of respective outputs from said first, second, third and fourth lane-marker-detectors; and a speed sensor for calculating a speed of the vehicle by performing addition and subtraction of respective outputs from said first, second, third and fourth lane-marker-detectors and by using one of a space "Ls" between said first and third lane-marker-detectors, and said second and fourth lane-marker-detectors.

* * * * *

UNITED STATES PATENT AND TRADEMARK OFFICE
CERTIFICATE OF CORRECTION

PATENT NO.   : 6,215,392 B1
DATED        : April 10, 2001
INVENTOR(S)  : Tsuyoshi Okda Page 1 of 1

It is certified that error appears in the above-identified patent and that said Letters Patent is hereby corrected as shown below:

<u>Column 7,</u>
Line 55, delete "iLs" and insert -- "Ls" --

Signed and Sealed this

Twenty-first Day of May, 2002

Attest:

Attesting Officer

JAMES E. ROGAN
*Director of the United States Patent and Trademark Office*